United States Patent
Hatada (10) Patent No.: US 10,796,226 B2
(45) Date of Patent: Oct. 6, 2020

(54) LASER PROCESSING APPARATUS AND MACHINE LEARNING DEVICE

(71) Applicant: FANUC CORPORATION, Yamanashi (JP)

(72) Inventor: Masanobu Hatada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 51 days.

(21) Appl. No.: 15/911,455

(22) Filed: Mar. 5, 2018

(65) Prior Publication Data

US 2018/0260712 A1  Sep. 13, 2018

(30) Foreign Application Priority Data

Mar. 7, 2017  (JP) .................. 2017-042849

(51) Int. Cl.

| | |
|---|---|
| B23K 26/03 | (2006.01) |
| B23K 26/21 | (2014.01) |
| B23K 26/38 | (2014.01) |
| B23K 26/70 | (2014.01) |
| B23K 26/04 | (2014.01) |
| G06N 3/08 | (2006.01) |
| B23K 26/08 | (2014.01) |
| G06N 3/00 | (2006.01) |

(52) U.S. Cl.
CPC .......... *G06N 3/086* (2013.01); *B23K 26/032* (2013.01); *B23K 26/04* (2013.01); *B23K 26/0876* (2013.01); *B23K 26/21* (2015.10); *B23K 26/38* (2013.01); *B23K 26/707* (2015.10); *G06N 3/006* (2013.01); *G06N 3/084* (2013.01); *G06N 3/088* (2013.01)

(58) Field of Classification Search
CPC .. B23K 26/0876; B23K 26/032; B23K 26/21; B23K 26/38; B23K 26/707; B23K 26/04; G06N 3/086
USPC ...................................... 219/121.69
See application file for complete search history.

(56) References Cited

U.S. PATENT DOCUMENTS

| | | | | |
|---|---|---|---|---|
| 2001/0036676 A1* | 11/2001 | Mitsuhashi | ........... | B24B 37/013 438/8 |
| 2004/0013430 A1* | 1/2004 | Asami | ................. | H04B 10/572 398/65 |
| 2007/0167526 A1* | 7/2007 | Zhang | ................. | A61K 9/0019 514/649 |

(Continued)

FOREIGN PATENT DOCUMENTS

| | | |
|---|---|---|
| CN | 1492488 A | 4/2004 |
| CN | 1905020 A | 1/2007 |

(Continued)

*Primary Examiner* — Dana Ross
*Assistant Examiner* — Kuangyue Chen
(74) *Attorney, Agent, or Firm* — Hauptman Ham, LLP (57) ABSTRACT

A laser processing apparatus that processes a workpiece using laser light outputted from a laser processing head includes an output detection unit for detecting an output of the laser light for a predetermined time period; a fluctuation calculation unit for calculating a fluctuation in the output of the laser light detected by the output detection unit; and an angle command unit for commanding an angle by which the laser processing head is to be inclined with respect to the normal of the workpiece, based on the fluctuation calculated by the fluctuation calculation unit.

7 Claims, 8 Drawing Sheets

(56) References Cited

U.S. PATENT DOCUMENTS

| | | | | |
|---|---|---|---|---|
| 2015/0131099 A1* | 5/2015 | Tahara | ............... | G01N 15/1427 |
| | | | | 356/442 |
| 2017/0028562 A1* | 2/2017 | Yamazaki | ............... | B25J 9/1612 |
| 2017/0091667 A1* | 3/2017 | Yukawa | ................ | G06N 20/00 |
| 2017/0220927 A1* | 8/2017 | Takigawa | ............. | B23K 26/032 |

FOREIGN PATENT DOCUMENTS

| | | | |
|---|---|---|---|
| CN | 101674913 A | | 3/2010 |
| CN | 104792705 A | | 7/2015 |
| CN | 105458509 A | | 4/2016 |
| JP | H8-39277 A | | 2/1996 |
| JP | H11-214783 A | | 8/1999 |
| JP | 2004-322146 A | | 11/2004 |
| JP | 2004322146 A | * | 11/2004 |
| JP | 2010-260095 A | | 11/2010 |
| JP | 2015-131645 A | | 7/2015 |
| JP | 5969676 B1 | | 8/2016 |

\* cited by examiner

LASER PROCESSING APPARATUS AND MACHINE LEARNING DEVICE

RELATED APPLICATIONS

The present application claims priority to Japanese Patent Application No. 2017-042849 filed on Mar. 7, 2017, the disclosure of which is hereby incorporated by reference herein in its entirety.

BACKGROUND OF THE INVENTION

1. Field of the Invention

The present invention relates to a laser processing apparatus and a machine learning device.

2. Description of Related Art

When workpieces are processed using laser light, the laser light is preferably applied to the workpieces in a perpendicular manner to the work surfaces of the workpieces. This is because applying the laser light perpendicularly to the work surface reduces the irradiation area of the work surface, thus increasing power density.

However, when the laser light is applied perpendicularly to the work surface, the laser light may be reflected from the work surface, and the reflected light may return to the laser oscillator. Specifically, when the work surface of the workpiece has a high reflectivity, the reflected light may be directly inputted to the laser oscillator. As a result, the oscillation state of the laser oscillator becomes unstable, and the output of the laser light becomes unstable as well, thus causing a deterioration in the processing state of the workpiece.

Therefore, a technique in which a laser processing head is inclined with respect to the normal to a work surface of a workpiece is known (for example, refer to Japanese Unexamined Patent Publication (Kokai) Nos. 2010-260095 and 2015-131645).

SUMMARY OF THE INVENTION

To incline a laser processing head, in general, while laser light is outputted, the laser processing head is gradually inclined with reference to a feedback value of the laser light. However, this method requires effort and time. Alternatively, a skilled operator may incline the laser processing head based on his/her own experience or the like. Such a case, however, requires a skilled operator, and it takes time to train such operators.

Therefore, it is desired to provide a laser processing apparatus and a machine learning device that can determine an appropriate angle by which the laser processing head is to be inclined, without requiring the effort or time of an operator.

A first aspect of this disclosure provides a laser processing apparatus for processing a workpiece using laser light outputted from a laser processing head. The laser processing apparatus includes an output detection unit for detecting an output of the laser light for a predetermined time period; a fluctuation calculation unit for calculating a fluctuation in the output of the laser light detected by the output detection unit; and an angle command unit for commanding an angle by which the laser processing head is inclined with respect to the position of the laser processing head perpendicular to the workpiece of the workpiece, based on the fluctuation calculated by the fluctuation calculation unit.

According to the first aspect, the angle of the laser processing head can be appropriately determined without requiring the effort or time of an operator.

The above objects, features, and advantages and other objects, features, and advantages of the present invention will become more apparent from the following detailed description of preferred embodiments along with the accompanying drawings.

DETAILED DESCRIPTION OF THE INVENTION

Embodiments of the present invention will be described below with reference to the accompanying drawings. In the drawings, the same reference numerals indicate the same components. For ease of understanding, the scales of the drawings have been modified in an appropriate manner.

Figure 1:
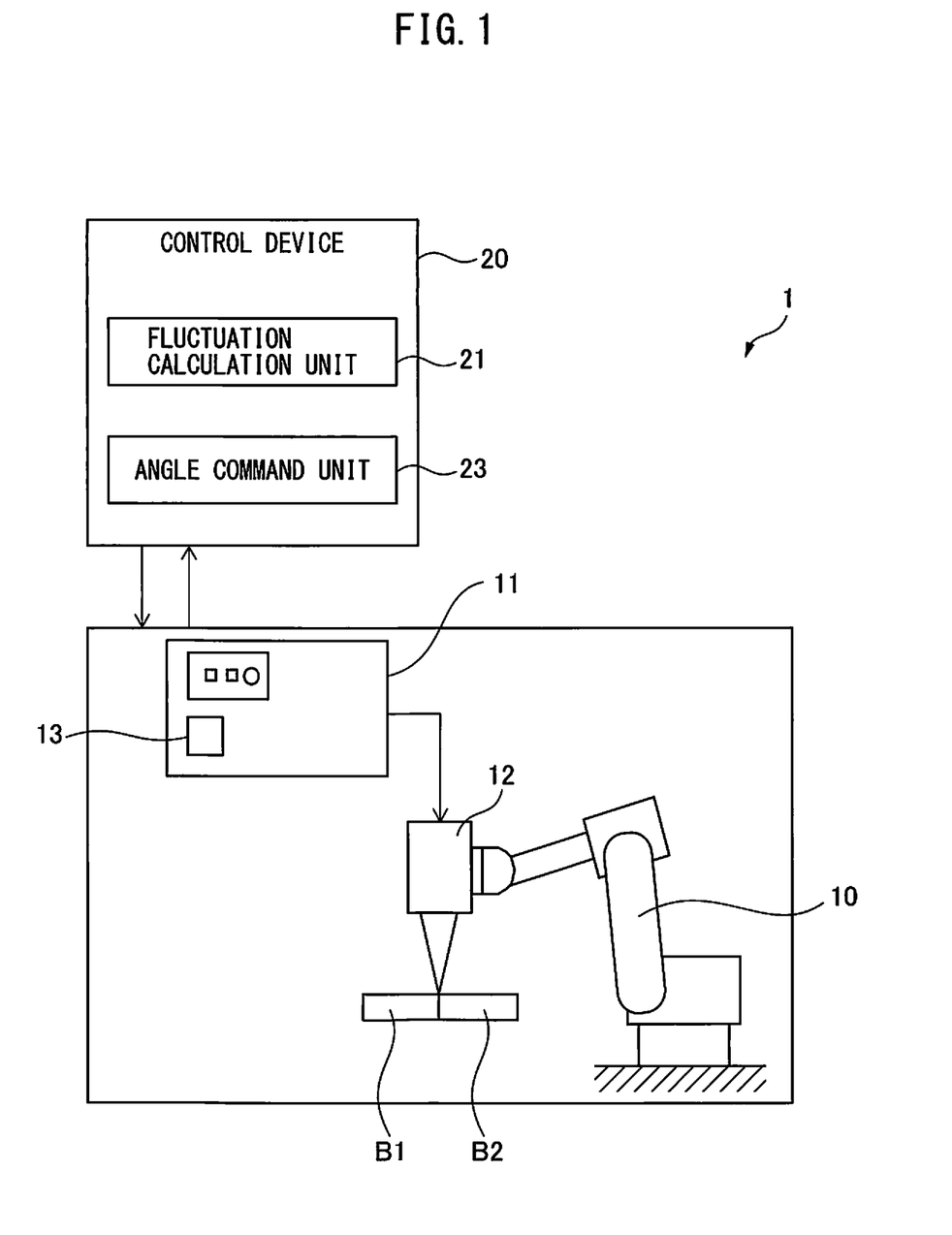
FIG. 1 is a block diagram of a laser processing apparatus according to a first embodiment of the present invention.

FIG. 1 is a block diagram of a laser processing apparatus according to a first embodiment. As illustrated in FIG. 1, the laser processing apparatus 1 mainly includes a robot 10, e.g., a vertical articulated robot, a laser oscillator 11, and a control device 20 for controlling the robot 10 and the laser oscillator 11. The laser oscillator 11 includes an output detection unit 13, for example, a laser power sensor 13 to detect the output of laser light.

A laser processing head 12 is attached to a distal end of an arm of the robot 10. Workpieces B1 and B2 are disposed in an operable range of the robot 10. Laser light emitted from the laser oscillator 11 is outputted towards the workpieces B1 and B2 through the laser processing head 12. By the application of the laser light, the workpieces B1 and B2 are processed in a specific manner, by, for example, welding, cutting, surface processing, or the like. Note that, the properties of each of the workpieces B1 and B2, including the dimensions, the properties of a material, and surface roughness of each of the workpieces B1 and B2, do not change. The laser light may be applied to a single workpiece to process the workpiece in a specific manner.

Figure 3A:
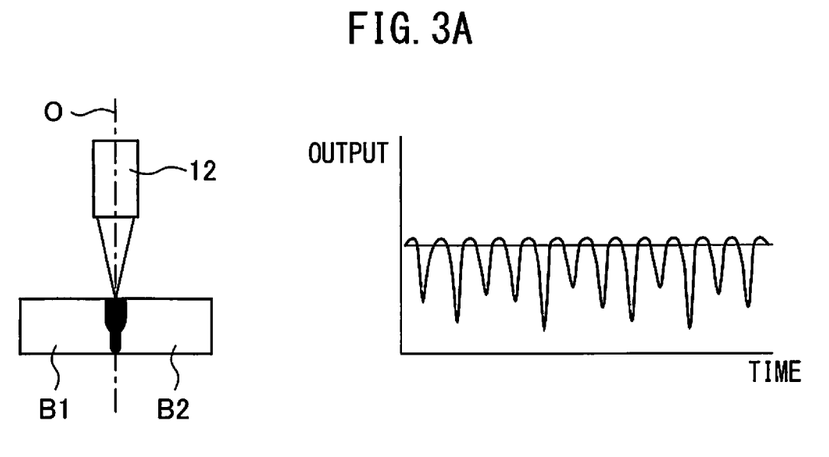
FIG. 3A is a first diagram showing the angle of a processing head, and the relationship between time and an output of laser light.
Figure 3B:
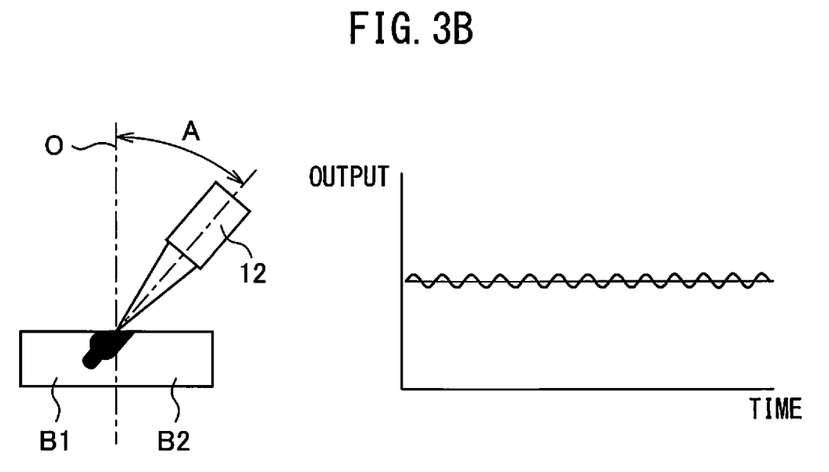
FIG. 3B is a second diagram showing the angle of a processing head, and the relationship between time and an output of laser light.

As illustrated in FIG. 3B described later, the robot 10 moves the laser processing head 12 so that the laser processing head 12 has a desired angle A with respect to a normal O extending from the work surfaces of the workpieces B1 and B2. The angle A of the laser processing head 12 is the same as the angle formed between the optical axis of the laser light outputted from the laser processing head 12 and the normal O. Thus, the angle A of the laser processing head 12 refers to the incident angle of the laser light.

The control device 20 is a digital computer including a CPU and a storage unit such as a memory. The control device 20 includes a fluctuation calculation unit 21 that calculates the fluctuation in the output of laser light detected by the laser power sensor 13 for a predetermined time period, as described later.

Furthermore, the control device 20 includes an angle command unit 23 that commands an angle by which the laser processing head 12 is to be inclined with respect to the normal O of the workpieces B1 and B2, based on the fluctuation calculated by the fluctuation calculation unit 21. The CPU of the control device 20 functions as the fluctuation calculation unit 21 and the angle command unit 23, etc.

Figure 2:
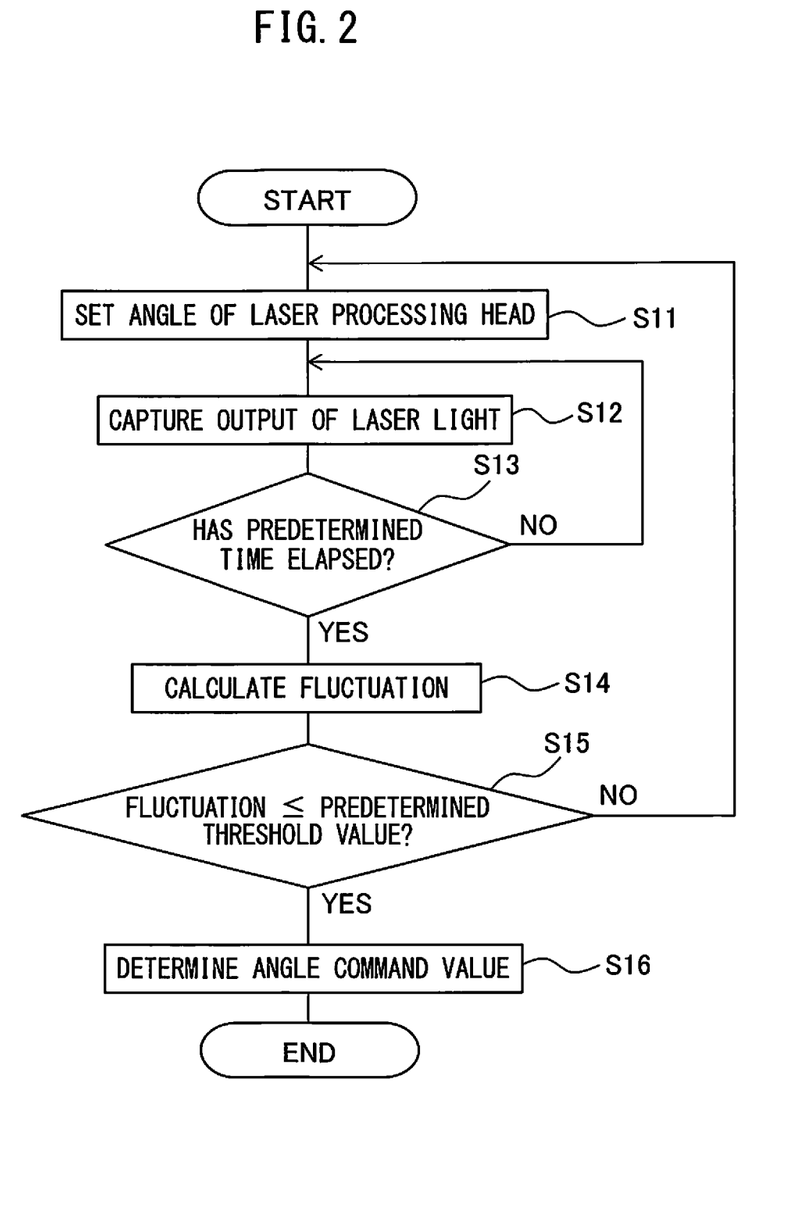
FIG. 2 is a flowchart showing the operation of the laser processing apparatus illustrated in FIG. 1.

FIG. 2 is a flowchart showing the operation of the laser processing apparatus illustrated in FIG. 1. The operation of the laser processing apparatus 1 according to the first embodiment will be described below with reference to FIGS. 1 and 2. In this instance, the workpieces B1 and B2 are not necessarily disposed under the laser processing head 12.

First, in step S11, the inclination angle of the laser processing head 12 with respect to the normal O is set at an initial angle, e.g., 0 degrees. The robot 10 is operated so as to locate the laser processing head 12 at the initial angle.

Then, in step S12, while laser light is outputted, the laser power sensor 13 captures the output of the laser light. When the output of the laser light is captured for a predetermined time period, as represented in step S13, the fluctuation calculation unit 21 calculates the fluctuation from the output of the laser light in step S14.

The laser processing head 12 is illustrated at the left of FIGS. 3A and 3B. In FIG. 3A, the laser processing head 12 is located so that the incident angle of laser light is 0 degrees. In FIG. 3B, the laser processing head 12 is located so that the laser processing head 12 is inclined by an angle A with respect to the normal O. Such a location operation is performed by the robot 10, but may be performed using another angle change mechanism to change the angle A, instead of the robot 10.

The relationship between time and the output of laser light is illustrated at the right of FIGS. 3A and 3B. In this relationship, the horizontal axis represents time, e.g., a predetermined time, and the vertical axis represents the output of laser light. Furthermore, the solid line parallel to the horizontal axis represents the output command value of the laser light, and the curved line represents the actual laser light output value captured by the laser power sensor 13.

As illustrated in FIG. 3A, when the laser processing head 12 is perpendicular to the workpieces B1 and B2, the actual laser light output curve varies relatively greatly. On the other hand, as illustrated in FIG. 3B, when the laser processing head 12 is inclined by the angle A with respect to the normal O, the actual laser light output curve varies relatively little.

In this application, the phrase "a fluctuation in laser light" refers to variations in the actual laser light output curve. Accordingly, when the laser processing head 12 is perpendicular to the workpieces B1 and B2, as shown in FIG. 3A, the actual laser light output curve fluctuates relatively greatly. On the other hand, when the laser processing head 12 is inclined by the angle A with respect to the normal O, as illustrated in FIG. 3B, the actual laser light output curve fluctuates relatively little. When the fluctuations are small, the laser light becomes stable, and therefore the workpieces B1 and B2 can be processed favorably.

To be more specific, the phrase "a fluctuation in laser light" may refer to a deviation between the maximum value and the minimum value of the actual laser light output curve. Alternatively, "a fluctuation in laser light" may be a division value calculated by dividing a integrated value of the actual laser light output curve by time. Furthermore, "a fluctuation in laser light" may be the maximum value of the inclination of the actual laser light output curve. In step S14 of FIG. 2, at least one of the above-described deviation, division value, and maximum inclination value is calculated as the fluctuation.

In step S15, the fluctuation is compared with a predetermined threshold value. As the predetermined threshold value, different values are prepared in advance, depending on the type of fluctuations, for example, the deviation, the division value, or the maximum inclination value. When the fluctuation is equal to or less than the predetermined threshold value, laser light is determined to be outputted stably, and therefore, the angle command unit 23 officially commands the angle command value that has been set in step S11 (step S16).

In contrast, when the fluctuation is not equal to or less than the predetermined threshold value in step S15, the operation returns to step S11, and the inclination angle of the laser processing head 12 is increased by a specific minute amount. The operation represented in steps S11 to S15 is repeated until the fluctuation becomes equal to or less than the predetermined threshold value.

As described above, in the first embodiment, an appropriate angle of the laser processing head 12 at which the fluctuation is equal to or less than the predetermined threshold value can be easily calculated. Thus, laser light can be stably outputted, and the workpieces can be processed favorably. Furthermore, since this operation can be performed automatically, not only effort or time of an operator but also the trained operator himself/herself becomes unnecessary.

Figure 4:
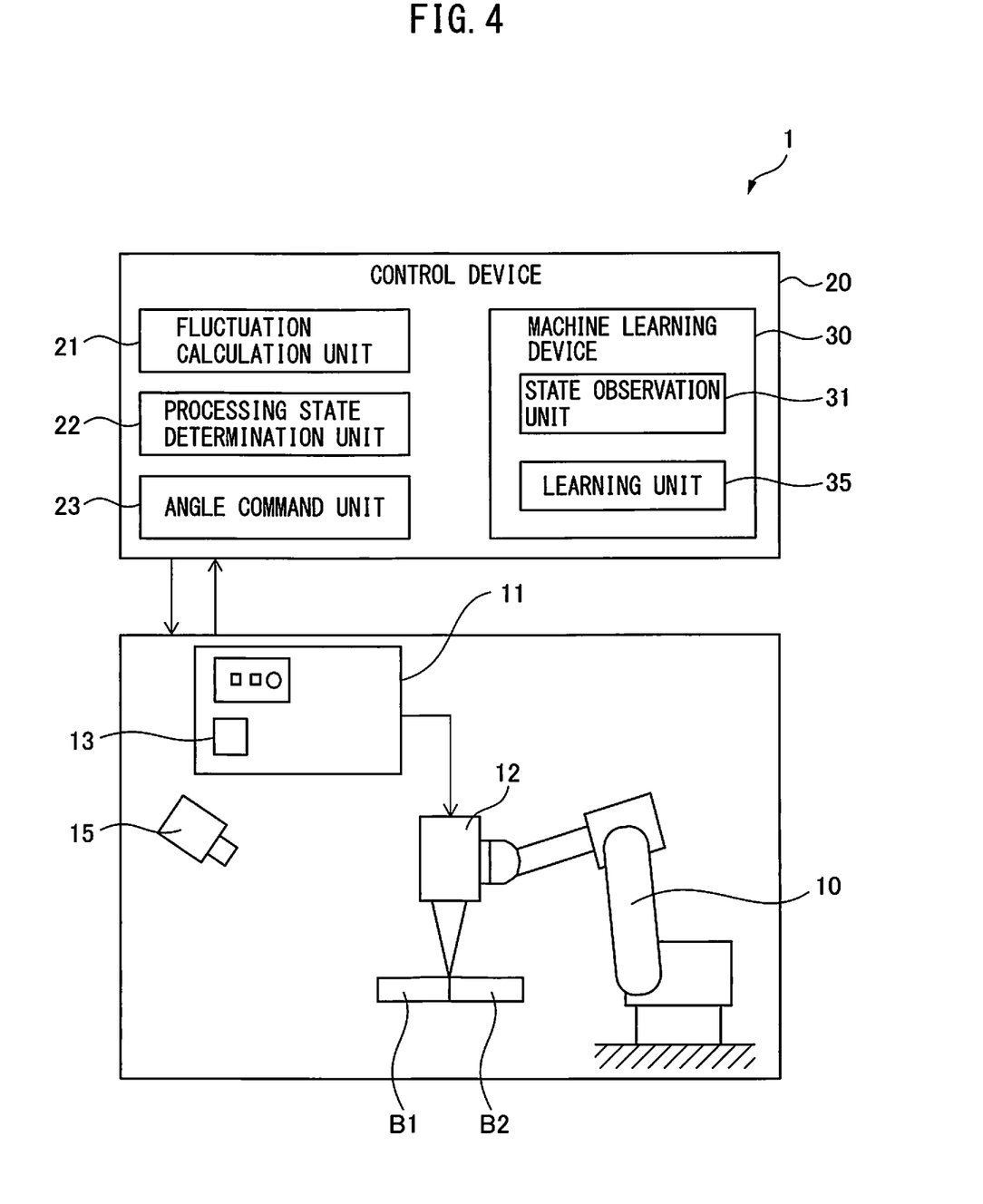
FIG. 4 is a block diagram of a laser processing apparatus according to a second embodiment.

FIG. 4 is a block diagram of a laser processing apparatus according to a second embodiment. In FIG. 4, a processing state detection unit 15, for example, a camera is disposed to detect a processing state of the workpieces B1 and B2. Furthermore, the control device 20 includes a processing state determination unit 22 that determines the processing state of the workpieces B1 and B2, based on an image captured by the processing state detection unit 15. Furthermore, the control device 20 includes a machine learning device 30 to learn the operation of processing the workpieces B1 and B2 using laser light outputted from the laser processing head 12. The machine learning device 30 may be communicably attached to the outside of the control device 20.

The machine learning device 30 includes a state observation unit 31 for observing state variables that include at least one of the fluctuation in the output of laser light and the processing state of the workpieces B1 and B2 processed using the laser light, and an angle command value for the laser processing head 12. The state observation unit 31 may be a storage unit, for example, a memory that can sequentially store the state variables with observation time.

Furthermore, the machine learning device 30 includes a learning unit 35 that learns at least one of the fluctuation and the processing state observed by the state observation unit 31, and the angle command value for the laser processing head 12 observed by the state observation unit 31, in relation to each other.

The learning unit 35 can use various machine learning algorithms including supervised learning, unsupervised learning, semi-supervised learning, reinforcement learning, transduction, multi-task learning, and the like. In the following description, the learning unit 35 performs reinforcement learning using Q-learning.

Figure 5:
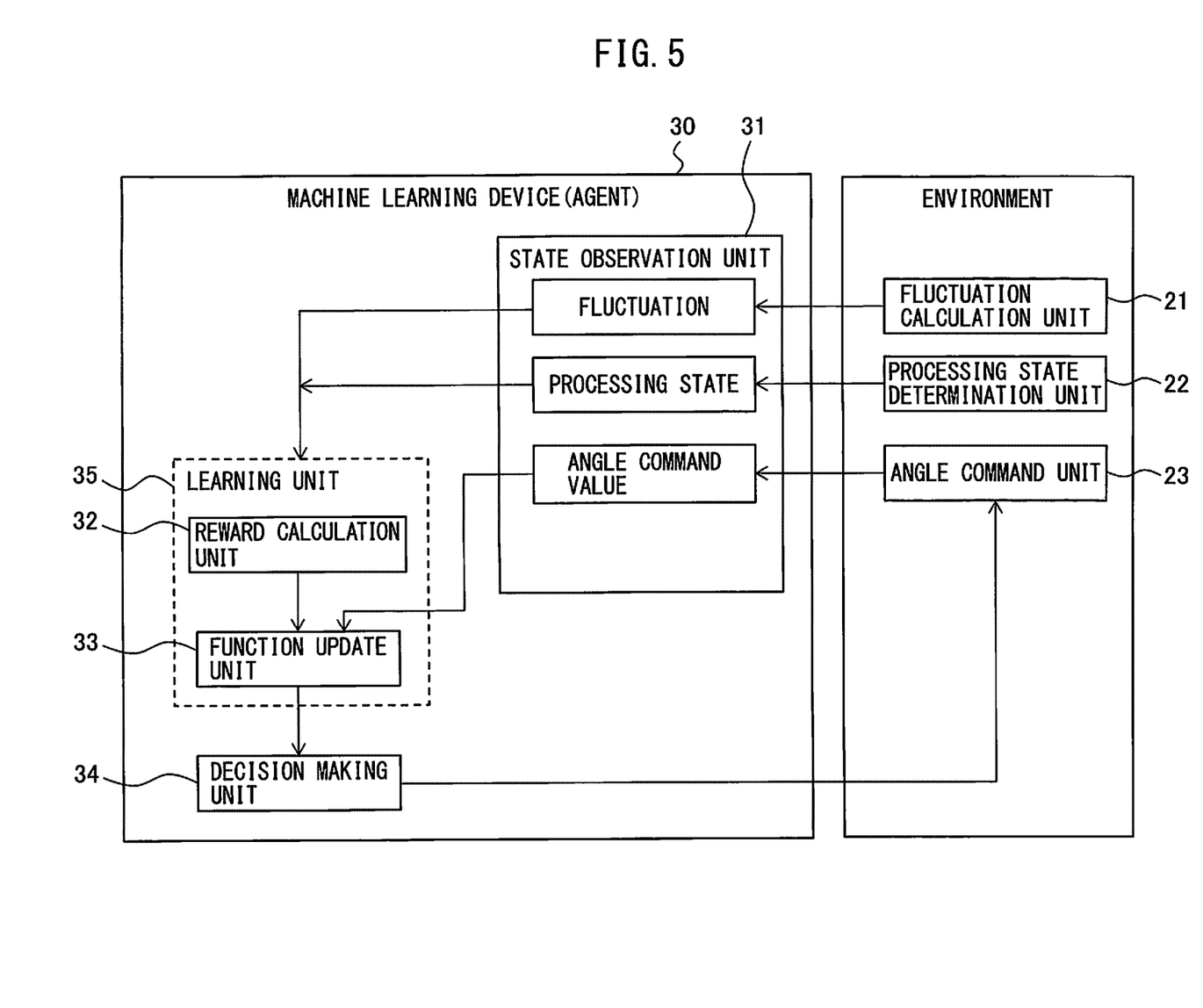
FIG. 5 is a block diagram of a machine learning device.

Referring to FIG. 5, which is a block diagram of the machine learning device, the machine learning device 30 corresponds to an agent of reinforcement learning. The fluctuation calculation unit 21, the processing state determination unit 22, and the angle command unit 23 detect the state of the environment.

The learning unit 35, which performs reinforcement learning, includes a reward calculation unit 32 that calculates a reward based on at least one of the fluctuation and the processing state observed by the state observation unit 31. Furthermore, the learning unit 35 includes a function update unit 33 (artificial intelligence) for updating a function, e.g., an action value function (action value table), that determines the angle command value for the laser processing head 12 from the current state variables, based on the reward calculated by the reward calculation unit 32. As a matter of course, the function update unit 33 may update another function.

The machine learning device 30 further includes a decision making unit 34 that decides an optimal value of the angle command value for the laser processing head 12 from the current state variables, based on the reward calculated by the reward calculation unit 32. The decision making unit 34 learns selection (decision making) of a better action. The decision making unit 34 may be included in the control device 20, instead of in the machine learning device 30.

Figure 6:
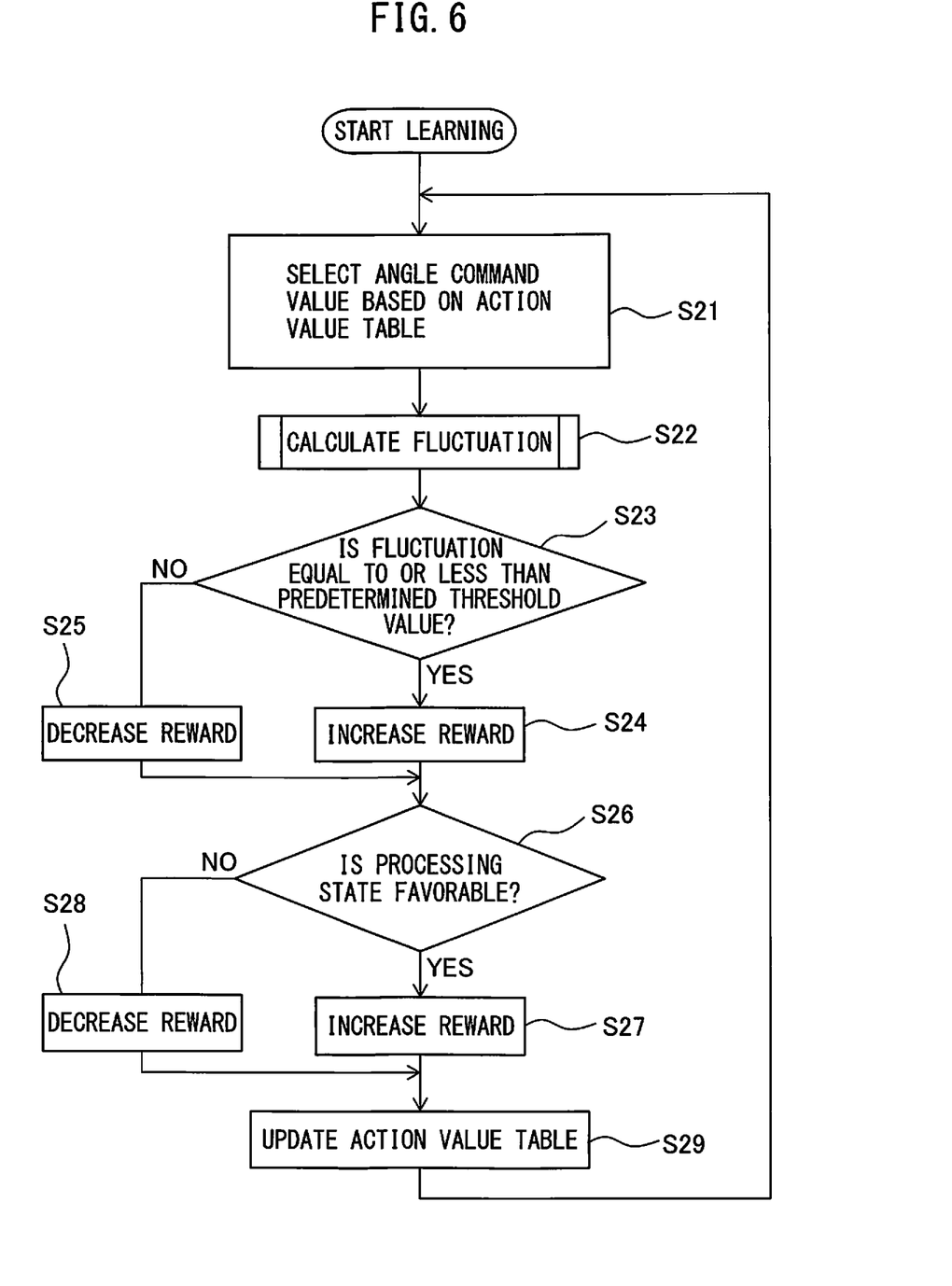
FIG. 6 is a flowchart showing the operation of the machine learning device.

FIG. 6 is a flowchart of the operation of the machine learning device. The operation of the machine learning device 30 will be described with reference to FIGS. 1 to 6. The operation of FIG. 6 is performed in certain control cycles while the laser processing apparatus 1 performs a processing operation on the workpieces B1 and B2.

First, in step S21 of FIG. 6, the angle command unit 23 of the control device 20 selects and commands an angle command value for the laser processing head. The angle command value for the laser processing head is selected at random from a specific range. Alternatively, for example, a minimum value of the angle command value for the laser processing head in the specific range is first selected, and a slightly increased value may be selected in the next cycle.

Then, in step S22, the fluctuation calculation unit 21 calculates the fluctuation in laser light. The fluctuation is calculated as described above by performing steps S12 to S14 of FIG. 2.

In step S23 of FIG. 6, the fluctuation is compared with a predetermined threshold value, as described above. When the fluctuation is equal to or less than the threshold value, the reward increases in step S24. When the fluctuation is not equal to or less than the threshold value, the reward decreases or remains unchanged in step S25.

Then, in step S26, the processing state determination unit 22 obtains image data of the processing state captured by the processing state detection unit 15. The processing state captured by the processing state detection unit 15 is a physical quantity of at least one of the appearance of a welding bead, the height of extra fill of the bead, the width of the bead, and the amount of occurrence of sputtering obtained by, for example, processing the image data. The amount of occurrence of sputtering can be obtained from sputtering residue deposited on the workpieces during welding.

Alternatively, as the processing state detection unit 15, a penetration measurement instrument or a sound collector may be used. In such an instance, the above-described processing state may include a penetration amount obtained from the penetration measurement instrument or an arc acoustic waveform obtained from the sound collector. Furthermore, a thermosensor may be used as the processing state detection unit 15. In such an instance, the processing state includes the temperature of the workpieces B1 and B2 and/or the temperature of the laser processing head 12.

In step S26, the processing state determination unit 22 determines whether or not the obtained processing state is favorable. For example, the processing state is compared with a threshold value, which is predetermined depending on each processing state. Alternatively, the operator may determine whether or not the processing state is favorable, using the detection result of the processing state detection unit 15. When the processing state is favorable, the reward increases in step S27. When the processing state is not favorable, the reward decreases or remains unchanged in step S28.

The reward calculation unit 32 calculates the increase or decrease of the reward. The increase or decrease amounts of the reward may be set in a stepwise manner. One of the determination steps of steps S23 and S26 and the related reward step may be omitted.

Thereafter, in step S29, the function update unit 33 updates the action value function. Q-learning performed by the learning unit 35 is a method for learning a value (the value of an action) Q(s, a) for selecting an action "a" in a certain environment state "s". Consequently, an action "a" having the highest Q(s, a) is selected in a certain state "s". In Q-learning, various actions "a" are performed in a certain state "s", and the correct Q(s, a) is learned through trial and error using rewards provided at that time. The following Equation (1) represents an update equation for the action value function Q(s, a).

$$Q(s_t, a_t) \leftarrow Q(s_t, a_t) + \alpha \left( r_{t+1} + \gamma \max_a Q(s_{t+1}, a) - Q(s_t, a_t) \right)$$

where, $s_t$ and $a_t$ represent the environment and the action, respectively, at a time t. By executing the action $a_t$, the environment changes to $s_{t+1}$, and the reward $r_{t+1}$ is calculated by the change of the environment. A term with "max" represents the product of a Q value, when an action "a" having the highest Q value (that has been known at that time) is selected in the environment $s_{t+1}$, and $\gamma$. "$\gamma$" is a discount factor in the range of $0 < \gamma \leq 1$ (usually, 0.9 to 0.99), and "a" is a learning rate in the range of $0 < \alpha \leq 1$ (usually, on the order of 0.1).

This update equation indicates that, as compared with an evaluation value $Q(s_t, a_t)$ of an action "a" in a state "s", if an evaluation value $Q(s_{t+1}, \max a_{t+1})$ of an optimal action in the next environmental state derived from the action "a" is higher, $Q(s_t, a_t)$ is increased. If not, $Q(s_t, a_t)$ is decreased. In brief, the value of an action in a certain state is approximated to an optimal action value in the next state. In other words, the learning unit 35 updates an optimal value of the angle command value for the laser processing head.

As described above, in step S29, the function update unit 33 updates the action value function using the equation (1). Thereafter, the operation returns to step S21, another angle command value for the laser processing head is selected, and the action value function is updated in the same manner. Note that, an action value table may be updated instead of the action value function.

In reinforcement learning, the learning unit 35, as an agent, decides an action based on the state of an environment. In this case, the action means that the decision making unit 34 selects a new value as the angle command value for the laser processing head, to perform an action in accordance with the new value. The new command value changes the environment shown in FIG. 5, e.g., the fluctuation in the output of laser light and the processing state of the workpieces B1 and B2 processed using the laser light. In accordance with the change in the environment, the machine learning device 30 is provided with the reward, as described above, and the decision making unit 34 of the machine learning device 30 learns selection of a better action (decision making) so as to obtain, for example, a higher reward.

Thus, repetition of the operation of FIG. 6 many times increases the reliability of the action value function. Therefore, for example, by selecting the angle command value for the laser processing head 12 based on the reliable action value function so as to increase the Q value, a more appropriate angle command value for the laser processing head 12 can be determined.

Therefore, it is possible to automatically use the contents updated by the function update unit 33 of the machine learning device 30 of the present invention as the angle command value for the laser processing head. Owing to introduction of the machine learning unit 30 into the control device 20, complying with learning results of the machine learning device, which can automatically adjust the angle command value for the laser processing head 12, serves to eliminate effort and time of an operator. Since the angle of the laser processing head 12 can be determined optimally, the laser light becomes stable, thus improving the processing state of the workpieces B1 and B2. As a result, production efficiency is improved.

A function that is approximated using a neural network, which is described later, may be used as the action value function. In such a case, the state variables observed by the state observation unit 31 may be computed in a multilayer structure to update the action value function in real time. This provides a more appropriate learning result. This method has a significant advantage to data having enormous "s" and "a" data amounts, such as image data.

The machine learning device 30 and the like illustrated in FIG. 5 will be described again in detail, though the description partly overlaps. The machine learning device 30 has the function of learning knowledge, as well as the functions of extracting useful rules, knowledge representations, criteria, and the like from a data group inputted to the device by analysis, and outputting determination results. There are various methods therefor, which are broadly divided into "supervised learning", "unsupervised learning" and "reinforcement learning". Moreover, when realizing these methods, a method called "deep learning" is used for learning the extraction of features themselves.

In "supervised learning", a large amount of data pairs of an input and a result (label) are provided to the learning device. The machine learning device learns features from the data set, and heuristically obtains a model to predict a result from an input, i.e., the relationship therebetween. In this embodiment, "supervised learning" can be used for estimating the angle command value for the laser processing head from the fluctuation in the output of the laser light and the processing state of the workpieces B1 and B2 processed using the laser light. "Supervised learning" can be realized using an algorithm such as a neural network described later.

In "unsupervised learning", only a large amount of input data is provided to the machine learning device. The machine learning device learns the distribution of the input data and applies compression, classification, alignment, and the like to the input data, without being supplied with corresponding output data as supervisors. The features of the data set can be clustered and the like based on their similarity. With the use of this result, while providing a certain criterion, an output is assigned so as to optimize the criterion, and this allows a prediction of the output. There is also a method called "semi-supervised learning" as an intermediate problem setting between "supervised learning" and "unsupervised learning", in which part of data includes pairs of an input and an output, while the other includes only inputs. In this embodiment, data that can be obtained without actually operating the laser processing apparatus is used in unsupervised learning, in order to improve learning efficiency.

In "reinforcement learning", problems are set as follows.

The control device 20 observes the environment state and decides an action.

The environment varies in accordance with some rule, and the action itself sometimes varies the environment.

A reward signal returns whenever the action is performed.

What is to be maximized is the sum of rewards (discounts) in the future.

The learning is started from a state in which a result brought about by an action is unknown or is not sufficiently known. The result is obtained as data only after the laser processing apparatus is actually operated. In other words, it is necessary to search for an optimal action through trial and error.

Learning may be started from a good start point by performing prior learning (using a method of above-described supervised learning or inverse reinforcement learning) so as to mimic the action of a human in an initial state.

"Reinforcement learning" is a method for learning optimal actions based on the interactions between an action and an environment by learning actions, as well as determining and classifying, in other words, a learning method to maximize a reward obtained in the future. In this embodiment, this indicates that actions having an effect on the future can be obtained. The following description takes Q-learning as an example, but is not limited thereto.

Q-learning is a method for learning a value $Q(s, a)$ of selecting an action "a" in a certain environment state "s". In other words, in a certain state "s", an action "a" having the highest value of $Q(s, a)$ is selected as the optimal action. However, as to a combination of a state "s" and an action "a", a correct value of $Q(s, a)$ is not initially known at all. Thus, the agent (a subject of an action) chooses various actions "a" in a certain state "s", and is provided with a reward for each action "a". Therefore, the agent learns to select a better action, i.e., a correct value of $Q(s, a)$.

The aim is to maximize the reward to be obtained in the future, i.e., to obtain $Q(s, a)=E[\Sigma\gamma^t r_t]$, as a result of actions (an expected value is taken when a state changes in accordance with optimal actions. The optimal actions have not been known, as a matter of course, and hence have to be found while learning). For example, an update equation for such a value $Q(s, a)$ is represented as follows (the same as the above equation (1)):

$$Q(s_t, a_t) \leftarrow Q(s_t, a_t) + \alpha\left(r_{t+1} + \gamma \max_a Q(s_{t+1}, a) - Q(s_t, a_t)\right)$$

where $s_t$ represents the environment state at a time t, and $a_t$ represents the action at the time t. By executing the action at, the state changes to $s_{t+1}$. "$r_{t+1}$" represents the reward provided by the state change. A term with "max" represents the product of a Q value when an action "a" having the highest Q value that has been known at that time is selected in the state $s_{t+1}$, and γ. "γ" is a parameter of 0<γ≤1, called discount factor. "α" is a learning rate in the range of 0<α≤1.

This equation indicates a method for updating an evaluation value Q ($s_t$, $a_t$) of an action at in a state $s_t$ based on a reward $r_{t+1}$ that has returned as a result of the trial at. This update equation indicates that, as compared with an evaluation value Q($s_t$, $a_t$) of an action "a" in a state "s", if an evaluation value Q($s_{t+1}$, max $a_{t+1}$) of an optimal action "max a" in the next state derived from a reward $r_{t+1}$ plus the action "a" is higher, Q($s_t$, $a_t$) is increased. If not, Q($s_t$, $a_t$) is decreased. In other words, the value of an action in a certain state is approximated to an optimal action value in the next state that is derived from the reward returning immediately as a result of the action and the action itself.

There are two methods for representing Q(s, a) in a computer, that is, a method in which Q values of all state-action pairs (s, a) are retained in a table (action value table) and a method in which a function for approximating Q(s, a) is prepared. In the latter method, the above-described update equation can be realized by adjusting the parameter for the approximation function using a stochastic gradient descent method or the like. As the approximation function, a neural network can be used as described later.

Figure 7:
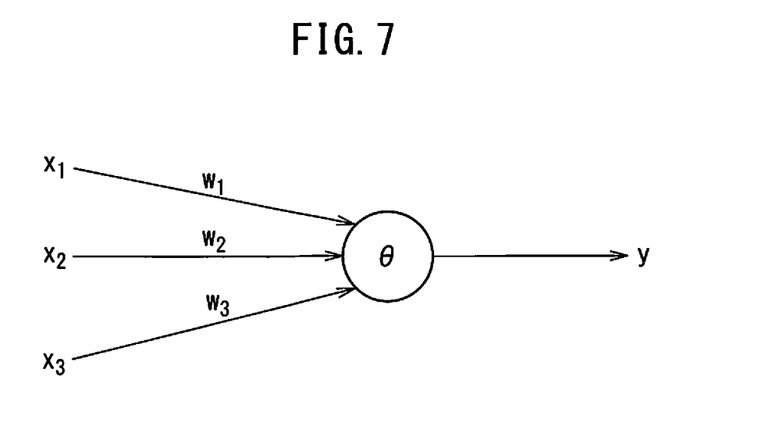
FIG. 7 is a schematic diagram of a neuron model.

As an approximation algorithm for a value function in supervised learning, unsupervised learning, and reinforcement learning, a neural network can be used. The neural network is constituted of, for example, an arithmetic unit, memory, and the like that imitate a neuron model as shown in FIG. 7. FIG. 7 is a schematic diagram of a neuron model.

As shown in FIG. 7, a neuron produces an output y in response to a plurality of inputs x (for example, inputs $x_1$ to $x_3$). Each of the inputs $x_1$ to $x_3$ is multiplied by a weight w ($w_1$ to $w_3$) corresponding to the input x. Thus, the neuron produces the output y represented by the following equation. Note that, all of the input x, the output y and the weight w are vectors.

$$y = f_k(\Sigma_{i=1}^n x_i w_i - \theta)$$

where θ is bias, and $f_k$ is an activation function.

Figure 8:
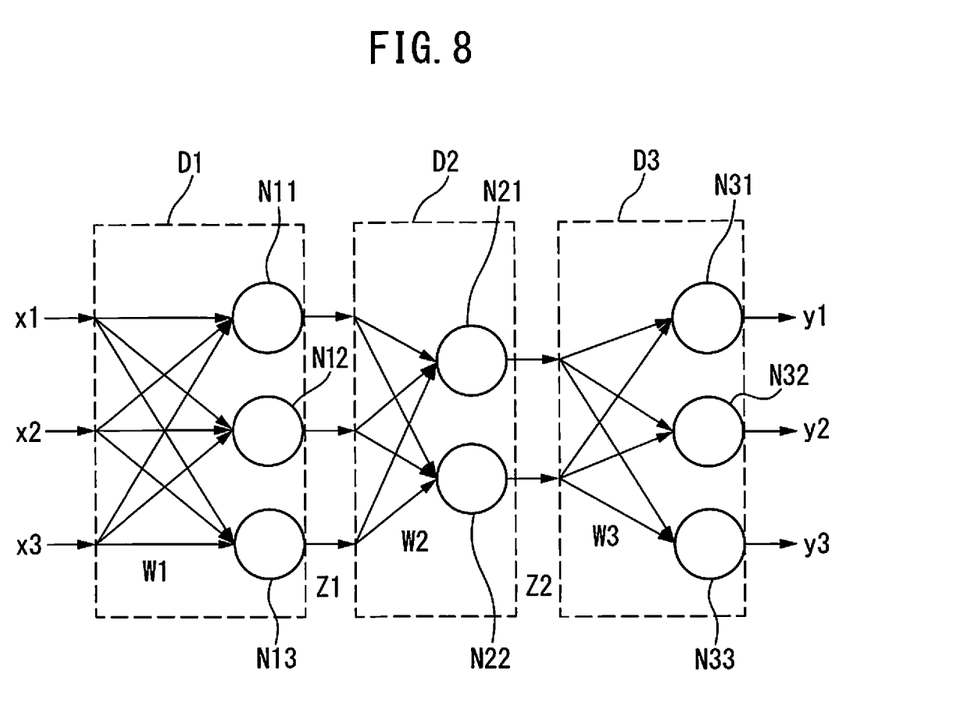
FIG. 8 is a schematic diagram of a neural network.

Then, a three-layer neural network having weights of three layers, which is constituted of a combination of the above-described neurons, will be described with reference to FIG. 8. FIG. 8 is a schematic diagram of a neural network having weights of three layers D1 to D3.

As shown in FIG. 8, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13, while being weighted correspondingly. The weights applied to the inputs are collectively indicated by w1.

The neurons N11 to N13 output vectors z11 to z13, respectively. The vectors z11 to z13 are collectively indicated by a feature vector z1, which is regarded as a vector that extracts a feature amount from the input vector. The feature vector z1 is a feature vector between the weight w1 and a weight w2.

The vectors z11 to z13 are inputted to each of two neurons N21 and N22, while being weighted correspondingly. The weights applied to the feature vectors are collectively indicated by w2.

The neurons N21 and N22 output vectors z21 and z22, respectively. The vectors z21 and z22 are collectively indicated by a feature vector z2. The feature vector z2 is a feature vector between the weight w2 and a weight w3.

The feature vectors z21 and z22 are inputted to each of three neurons N31 to N33, while being weighted correspondingly. The weights applied to the feature vectors are collectively indicated by w3.

Finally, the neurons N31 to N33 output results y1 to y3, respectively.

The neural network has a learning mode and a value prediction mode. In the learning mode, the weight w is learned using a learning data set. In the value prediction mode, the action of the laser processing apparatus is determined through the use of the parameter (the term "prediction" is used for the sake of convenience, but various tasks including detection, classification, inference, and the like can be performed).

In the value prediction mode, data that has been obtained by actual operation of the laser processing apparatus may be immediately learned and reflected in the next action (on-line learning). Alternatively, learning may be collectively performed using a data group collected in advance, and a detection mode may be performed thereafter using the parameter (batch learning). In an intermediate manner, the learning mode may be performed whenever a certain amount of data is accumulated.

The weights w1 to w3 can be learned using an error back propagation algorithm (backpropagation algorithm). Information about an error enters from the right and propagates to the left. The error back propagation algorithm is a method in which each weight is adjusted (learned) with respect to each neuron so as to minimize the difference between an output y and the actual output y (supervisor) in response to an input x.

Such a neural network may have more than three layers (called deep learning). An arithmetic unit that performs feature extraction from inputs in stages and regression of results can be automatically acquired only from supervisor data.

Accordingly, in order to perform Q-learning described above, as shown in FIG. 5, the machine learning device 30 according to this embodiment includes the state observation unit 31, the learning unit 35, and the decision making unit 34. However, the machine learning method applicable to this embodiment is not limited to Q-learning. For example, in the instance of using supervised learning, the value function corresponds to the learning model, and the reward corresponds to the error.

Figure 9:
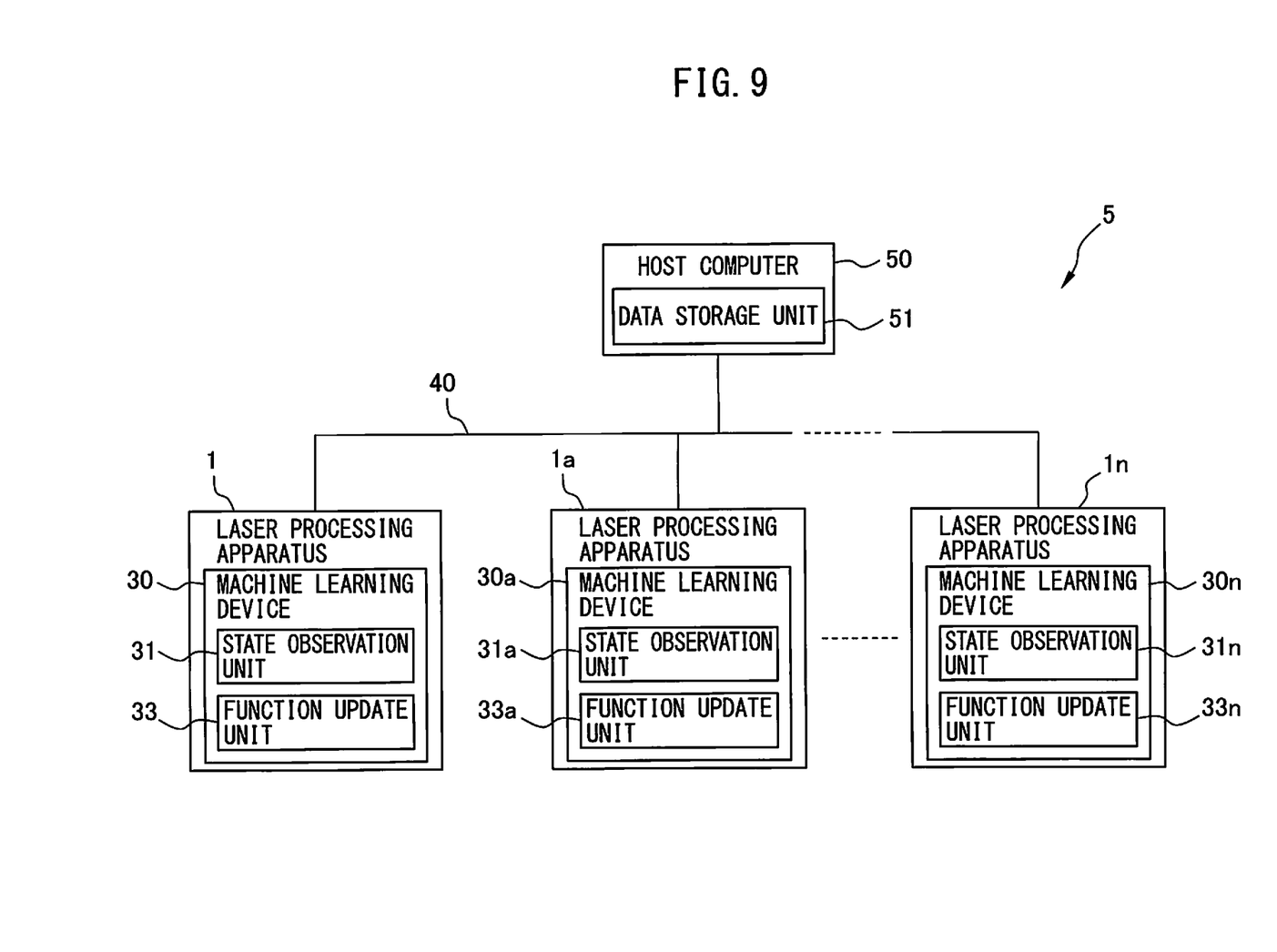
FIG. 9 is a schematic diagram of a laser processing system.

FIG. 9 is a schematic diagram of a laser processing system. As shown in FIG. 9, a laser processing system 5 includes a plurality of laser processing apparatuses 1 and 1a to 1n. The laser processing apparatuses 1 and 1a to 1n include machine learning devices 30 and 30a to 30n, respectively. The machine learning devices 30 and 30a to 30n include state observation units 31 and 31a to 31n, and function update units 33 and 33a to 33n, respectively, similar to as described above. As is apparent from FIG. 9, the laser processing apparatuses 1 and 1a to 1n are connected to each other through a communication unit 40. The communication unit 40 is a wired or wireless network.

By performing machine learning in a repeated manner, various physical values and learning results, e.g., the angle of the laser processing head 12, are stored in the state observation unit 31 of the laser processing apparatus 1 or the like. The above-described function is stored in the function update unit 33.

Thus, for example, even when the machine learning device 30a of the laser processing apparatus 1a does not perform machine learning, the contents stored in the state observation unit 31 and the function update unit 33 of the laser processing apparatus 1 can be incorporated into the state observation unit 31a and the function update unit 33a of the other laser processing apparatus 1a through the communication unit 40. Therefore, the machine learning device 30a of the laser processing apparatus 1a can use reliable learning results and the like, without actually performing machine learning. The same is true for the other laser processing apparatuses 1a and the like.

Furthermore, in FIG. 9, a host computer 50, e.g., a server having a data storage unit 51, is wiredly or wirelessly connected to the communication unit 40. Note that, the host computer 50 may be directly connected to, for example, the single laser processing apparatus 1.

The physical values, learning results, and the like stored in the state observation unit 31 of the laser processing apparatus 1 and the function stored in the function update unit 33 may be stored in the data storage unit 51 of the host computer 50 through the communication unit 40. In this case, the other laser processing apparatus 1a accesses the data storage unit 51 of the host computer 50 to incorporate the above-described learning results and function into the state observation unit 31a and the function update unit 33a, respectively. In other words, even if the single laser processing apparatus 1 is temporarily disconnected from the network, the other laser processing apparatus 1a can obtain the above-described learning results and function.

ASPECTS OF DISCLOSURE

A first aspect provides a laser processing apparatus (1) for processing a workpiece using laser light outputted from a laser processing head (12). The laser processing apparatus includes an output detection unit (13) for detecting an output of the laser light for a predetermined time period; a fluctuation calculation unit (21) for calculating a fluctuation in the output of the laser light detected by the output detection unit; and an angle command unit (23) for commanding an angle by which the laser processing head is to be inclined with respect to the normal of the workpiece, based on the fluctuation calculated by the fluctuation calculation unit.

According to a second aspect, the laser processing apparatus according to the first aspect further includes a machine learning device (30) for learning an operation of processing the workpiece using the laser light outputted from the laser processing head. The machine learning device includes a state observation unit (31) for observing state variables including the fluctuation in the output of the laser light, a processing state of the workpiece processed using the laser light, and an angle command value for the laser processing head; and a learning unit (35) for learning at least one of the fluctuation and the processing state observed by the state observation unit, and the angle command value for the laser processing head observed by the state observation unit, in relation to each other.

According to a third aspect, in the second aspect, the learning unit includes a reward calculation unit (32) for calculating a reward based on at least one of the fluctuation and the processing state observed by the state observation unit; and a function update unit (33) for updating a function to determine the angle command value for the laser processing head from the state variables at present, based on the reward calculated by the reward calculation unit.

According to a fourth aspect, the laser processing apparatus according to the second or third aspect further includes a decision making unit (34) for determining an optimal value of the angle command value for the laser processing head from the state variables at present, based on a learning result of the learning unit.

According to a fifth aspect, in any one of second to fourth aspects, the learning unit computes the state variables observed by the state observation unit in a multilayer structure, and updates the function in real time.

According to a sixth aspect, in any one of second to fifth aspects, the function of the function update unit is updated using a function updated by a function update unit of another machine learning device.

According to a seventh aspect, a machine learning device (30) for learning an operation of processing a workpiece using laser light outputted from a laser processing head includes a state observation unit (31) for observing state variables including at least one of a fluctuation in an output of the laser light in a predetermined time period and a processing state of the workpiece processed using the laser light, and an angle command value for the laser processing head of the laser light; and a learning unit (35) for learning at least one of the fluctuation and the processing state observed by the state observation unit, and the angle command value for the laser processing head observed by the state observation unit, in relation to each other.

According to an eighth aspect, in the seventh aspect, the learning unit includes a reward calculation unit (32) for calculating a reward based on at least one of the fluctuation and the processing state observed by the state observation unit; and a function update unit (33) for updating a function to determine the angle command value for the laser processing head from the state variables at present, based on the reward calculated by the reward calculation unit.

According to a ninth aspect, the machine learning device according to the seventh or eighth aspect further includes a decision making unit (34) for determining an optimal value of the angle command value for the laser processing head from the state variables at present, based on a learning result of the learning unit.

According to a tenth aspect, in any one of seventh to ninth aspects, the learning unit computes the state variables observed by the state observation unit in a multilayer structure, and updates the function in real time.

According to an eleventh aspect, in any one of seventh to tenth aspects, the function of the function update unit is updated using a function updated by a function update unit of another machine learning device.

A twelfth aspect provides a laser processing apparatus (1) including the machine learning device according to any one of seventh to eleventh aspects.

Advantageous Effects of the Aspects

According to the first aspect, an appropriate angle of the laser processing head can be easily determined without requiring the effort or time of an operator. Therefore, laser light can be outputted stably, and the workpiece can be processed favorably.

According to the second to fourth aspects and the seventh to ninth aspects, an appropriate angle for the laser processing head can be optimally determined using the machine learning device, without requiring the effort or time of the operator.

According to the fifth and tenth aspects, an appropriate learning result can be obtained.

According to the sixth and eleventh aspects, since a learning result obtained by a certain machine learning device can be incorporated into another machine learning device, a learning result and the like having high reliability can be shared.

According to the twelfth aspect, by complying with a learning result of the machine learning device, an operator need not determine an appropriate angle for the laser processing head. Therefore, it is possible to reduce effort or manhours to determine the optimal angle.

The present invention has been described using typical embodiments, but it is apparent for those skilled in the art that the above-described modifications and various other modifications, omissions, and additions can be made without departing from the scope of the present invention. For example, an actual value of the angle A of the laser processing head 12 may be further inputted to the state observation unit 31, to output an angle command value, as described above.

What is claimed is:

1. A laser processing apparatus, comprising:
a laser processing head configured to output laser light for processing a workpiece;
a laser power sensor configured to detect an output of the laser light for a predetermined time period; and
a controller configured to:
calculate a fluctuation in the output of the laser light detected by the laser power sensor; and
command an angle by which the laser processing head is to be inclined with respect to a position of the laser processing head perpendicular to the workpiece, based on the calculated fluctuation in the output of the laser light,
wherein the fluctuation is a deviation between a maximum value and a minimum value of an actual laser light output curve, which is captured for the predetermined time period when processing the workpiece.

2. The laser processing apparatus according to claim 1, further comprising:
a machine learning device comprising a processor configured to:
learn an operation of processing the workpiece using the laser light outputted from the laser processing head, wherein
the processor is further configured to:
observe
state variables including the fluctuation in the output of the laser light and a processing state of the workpiece processed using the laser light, and
an angle command value for the laser processing head, said angle command value corresponding to the angle by which the laser processing head is commanded to be inclined; and
learn at least one of the fluctuation and the processing state in relation to the angle command value for the laser processing head.

3. The laser processing apparatus according to claim 2, wherein
the processor is further configured to:
calculate a reward based on said at least one of the fluctuation and the processing state; and
update a function to determine the angle command value for the laser processing head from the state variables at present, based on the reward.

4. The laser processing apparatus according to claim 2, wherein the processor is further configured to:
determine an optimal value of the angle command value for the laser processing head from the state variables at present, based on a learning result.

5. The laser processing apparatus according to claim 3, wherein the processor is further configured to compute the state variables observed in a multilayer structure, and update the function in real time.

6. The laser processing apparatus according to claim 3, wherein the function is updated by a processor of another machine learning device.

7. A laser processing apparatus, comprising:
a laser processing head configured to output laser light for processing a workpiece; and
a laser power sensor configured to detect an output of the laser light for a predetermined time period; and a controller configured to:
calculate a fluctuation in the output of the laser light detected by the laser power sensor; and
command an angle by which the laser processing head is to be inclined with respect to a position of the laser processing head perpendicular to the workpiece, based on the calculated fluctuation in the output of the laser light,
wherein the fluctuation is a division value calculated by dividing an integrated value of an actual laser light output curve by time, the actual laser light output curve being captured for the predetermined time period when processing the workpiece.

* * * * *